(12) United States Patent
Kemper et al.

(10) Patent No.: US 7,653,604 B2
(45) Date of Patent: Jan. 26, 2010

(54) NATURAL LANGUAGE QUERY SYSTEM FOR ACCESSING AN INFORMATION SYSTEM

(75) Inventors: Charles Kemper, Brussels (BE); François Leger, Brussels (BE); Aart Den Ouden, Brussels (BE)

(73) Assignee: Voice-Insight, Brussels (BE)

( * ) Notice: Subject to any disclaimer, the term of this patent is extended or adjusted under 35 U.S.C. 154(b) by 161 days.

(21) Appl. No.: 11/399,053

(22) Filed: Apr. 6, 2006

(65) Prior Publication Data

US 2006/0184476 A1    Aug. 17, 2006

Related U.S. Application Data

(63) Continuation-in-part of application No. 10/634,354, filed as application No. PCT/BE02/00024 on Feb. 28, 2002, now abandoned.

(30) Foreign Application Priority Data

Feb. 28, 2001   (EP) ................... 01200749

(51) Int. Cl.
   G06E 1/00  (2006.01)
   G06E 3/00  (2006.01)
(52) U.S. Cl. .................... 706/20; 703/23; 704/246; 704/251; 704/270
(58) Field of Classification Search .......... 706/20; 704/246; 715/503; 382/187, 115
   See application file for complete search history.

(56) References Cited

U.S. PATENT DOCUMENTS 4,688,195 A    8/1987   Thompson et al.

(Continued)

FOREIGN PATENT DOCUMENTS

KR    1019990068379 A   4/2002
WO      00/65814 A1   11/2000

OTHER PUBLICATIONS

West, V., "Natural Language Database Enquiry", ICL Technical Journal, Peter Pergrinus Ltd., HitchIn, GB, vol. 5, No., May 1, 1986, pp. 46-63, XP000001670.

(Continued)

*Primary Examiner*—David R Vincent
*Assistant Examiner*—Kalpana Bharadwaj
(74) *Attorney, Agent, or Firm*—Fitch, Even, Tabin & Flannery

(57) ABSTRACT

An interaction system for enabling a user of information systems to interact with the information systems and a method of transmitting user queries from a speech, image or handwriting recognition system to the information systems. The interaction system is connectable to at least one recognition system and at least one information system and comprises at least one domain module for containing phrase set-ups constructed based on object classes, attribute classes and action classes that are common to all information systems of a given application domain and are provided to be tailored to a specific information system of the application domain by applying object, action and attribute types proper to the information system and specific object, action and attribute instantiations, obtained from the specific information system, in order to define a grammar essentially consisting in a set of term elements comprising specific object, attribute and action instantiations of those object, action and attribute types and a set of rules governing the use of these term elements in a set of valid user query phrases for interaction between the user and the specific information system through the recognition and interaction systems. The interaction system can also comprise at least one generic module, connectable to a recognition system, and/or at least one adapter module, connectable to an information system. The transmission method comprises the steps of defining the grammar and converting user queries into valid user query phrases according to the grammar and/or sets of term elements and rules of the grammar.

15 Claims, 2 Drawing Sheets

U.S. PATENT DOCUMENTS

| | | | |
|---|---|---|---|
| 5,083,268 | A | 1/1992 | Hemphill et al. |
| 6,023,697 | A | 2/2000 | Bates et al. |
| 6,285,785 | B1 * | 9/2001 | Bellegarda et al. .......... 382/187 |
| 6,314,402 | B1 | 11/2001 | Monaco et al. |
| 6,356,869 | B1 | 3/2002 | Chapados et al. |
| 2002/0069220 | A1 * | 6/2002 | Tran .......................... 707/503 |

OTHER PUBLICATIONS

Zoeppritz, M., "Datenabfrage in natürlicher Sprache, Natural Lanuage Data Base Query", it & ti Informationstechnik und Technische Informatik, Oldenbourg Verlag. Munchen, DE, vol. 36, No. 2, Apr. 1, 1994, pp. 14-18, XP000465092, ISSN: 0944-2774, p. 17, col. 2, p. 18, col. 1.

Attwater, D.J. and Whittaker, S.J., "Issues in Large-Vocabulary Interactive Speech Systems", BT Technology Journal, BT Laboratories, vol. 14, No. 1, Jan. 1996, pp. 177-186, XP000554647, ISSN:1358-3948.

* cited by examiner

NATURAL LANGUAGE QUERY SYSTEM FOR ACCESSING AN INFORMATION SYSTEM

CROSS REFERENCE TO RELATED APPLICATION

This application is a continuation-in-part of U.S. patent application Ser. No. 10/634,354, filed Aug. 5, 2003, which is a continuation of International Application No. PCT/BE02/00024, filed on Feb. 28, 2002, designating the United States of America, which claims priority from European Application No. 01200749.8, filed Feb. 28, 2001, and hereby incorporated herein by reference in its entirety.

FIELD OF THE INVENTION

The present invention relates to an interaction system and method for enabling a user to interact with an information system by means of a recognition system.

This invention thus enables the user to apply, by user queries, actions defined by the information system to objects stored in the databases handled by the information system and identified by attributes.

BACKGROUND

Among recognition systems, one finds namely speech recognition systems with which the user can input information by way of speech; image recognition systems with which the user can input information by way of visible symbols; and handwriting recognition systems, with which the user can input information by way of handwritten symbols.

Information systems manage objects that are usually stored in databases. These databases are commonly customized by their users, as well as the information systems aimed at exploiting said data bases.

In databases, the objects are grouped into object types identified by a code. Each object type comprises a set of object instantiations, that is, specific objects, of the considered type. With each object type are associated a set of attributes that characterize each specific object instantiation of that object type. Attributes may be grouped into attribute categories. These categories can be defined either by the types of the underlying objects they references such as their nature (numerical, textual . . . ) or by the role of the attribute towards the owning object (naming attribute, length definition . . . ).

Each information system is adapted to the databases it has to handle and thus may address the object types, attribute categories, and object instantiations of an object type having certain specific attribute instantiations. Therefore, the codes used by a database to identify object types and attribute categories are recognized by the information system that has to handle said database.

Moreover, each information system contains action types grouping specific actions to be applied on the objects stored in a database. Each action type comprises specific instantiations of actions that can be applied to the specific object instantiations of one ore more object types.

Information systems are used in various application domains such as Geographical Information Systems (GIS), Enterprise Resource Planning (ERP) systems, Document Management (DM) systems or Product Data Management (PDM) systems to name a few well known business application domains.

Traditionally, the users of a specific information system have to interact with this system by means of an interface specially developed for the system, and which will be different from one system to another even in the same application domain. An example of one such information system with a customized speech recognition interface is disclosed in D. J. Attwater and S J Whittaker, "Issues in large-vocabulary interactive speech systems", BT Technology Journal, Vol. 14, Nr. 1, pages 177-186. In this document, an information manager is provided that receives the recognition results and converts them into action demands to the application database, and also uses information from the application database and a dialogue manager to provide recognition constraints for the speech recognition system. However, this information manager is bound to a given application database and speech recognition platform. Moreover, the recognition constraints it provides to the speech recognition platform are very basic and do not enable the recognition of complex, natural language user queries.

U.S. Pat. No. 6,314,402 (Monaco et al.) discloses a more versatile system that is suitable for a variety of speech recognition platforms, and provides them with more complex recognition constraints so as to enable natural language interaction. However, it does not address the issue of versatility in the sense of enabling a variety of information systems to be queried.

U.S. Pat. No. 6,023,697 (Bates et al.) also relates to the link between an information system and a speech recognition system for the input of user queries, but again, only for one specific information system and speech recognition system. It also does not address the issue of recognizing more complex user queries, providing instead guidelines to the user on how to formulate his or her queries.

U.S. Pat. No. 6,356,869 (Chapados et al.) relates to means for natural language speech recognition, but does not address the issue of versatility.

V. West, "Natural language database enquiry", ICL Technical Journal, Vol. 5, Nr. 1, pages 46-63, does address the issue of natural language user queries, but not in the context of speech, or other, recognition systems. Moreover, it also relates to a customized interface, specifically developed for a given information system.

The object of the invention is thus to provide an interaction system that enables interactions of a user with any of a variety of information systems of at least one given application domain through any of a variety of recognition systems.

SUMMARY

The inventors have discovered that for all the information systems of a given application domain, common object classes, attribute classes and action classes can be defined. Each one of these classes respectively groups object types and instantiations, attribute categories and instantiations and action types and instantiations that present a common characteristic, said characteristic being common to all the information systems of said application domain. A specific object instantiation will be part of several object classes if it presents the characteristics of all these different classes. Based on said object, attribute and action classes, action phrase set-ups can be constructed that will constitute models to be tailored to each specific information system of said application domain by applying the object types, attribute categories and action types proper to said specific information system and the specific object instantiations and corresponding specific instantiations of attributes stored in the databases handled by said information system. The thus tailored action phrase set-ups used to generate valid user query phrases therefore define a grammar essentially consisting of a set of rules and a set of term elements, comprising the specific objects, attributes and action instantiations of those object types, attribute categories and action types, provided to be used in the interactions of the user with said specific information system of said application domain.

Therefore, the invention provides an interaction system for enabling a user of at least one information system belonging to an application domain to interact with said at least one information system, so that the at least one information system executes a set of actions on a set of objects characterized by a set of attributes; wherein:

said actions, objects and attributes are classifiable in action types, object types and attribute categories specific to each one of said at least one information system, and in action classes, object classes and attribute classes common to several information systems of said application domain, said interaction system is connectable to said at least one information system, said interaction system is also connectable to a user interface comprising at least one recognition system, so as to enable the user to interact with that said at least one information system by means of user queries processed by said at least one recognition system, and wherein said interaction system comprises at least one domain module for containing the object classes, attribute classes and action classes of said application domain, and phrase setups having a structure based on said object classes, attribute classes and action classes and provided to be tailored to said at least one information system of said application domain by applying in said phrase set-ups the specific object types, action types and attribute categories of said at least one information system corresponding to the object, action and attribute classes in said phrase setups and object, action and attribute instantiations obtained from said at least one information system corresponding to the object, action and attribute classes in said phrase setups, in order to define a grammar essentially consisting in a set of term elements comprising the object, attribute and action instantiations obtained from said at least one information system and a set of rules governing the use of these term elements in a set of valid user query phrases for interaction between the user and said at least one information system through said recognition and interaction systems.

The interaction system of the invention therefore provides the user with a means to interact with information systems through spoken, visual and/or handwritten natural language user queries, these means further being easily adaptable to a variety of recognition systems and of information systems in a variety of application domains.

Preferably, the interaction system according to the invention comprises at least one generic module, connected to the at least one domain module and connectable to at least one recognition system, for converting said sets of term elements and rules and/or a set of valid user query phrases generated using said sets of term elements and rules into a digital form suitable for being processed by the recognition system for the recognition of user queries and for converting a digital form of a user query, produced by said recognition system in response to said user query and suitable for being processed by a computer, into a phrase according to said grammar and/or into term elements and rules from said sets of term elements and rules. This has the advantage of providing a modular interface between the at least one domain module and the recognition system.

It is more preferred that said generic module comprises an element containing recognition system configuration information. This has the advantage of facilitating the exchange of information between said generic module and the at least one recognition system to which it is to be connected.

In another preferred configuration of the interaction system according to the invention, it comprises an adapter module connected to said at least one domain module and connectable to a specific one of said information systems, for receiving object types, attribute categories and action types of said specific information system as well as specific object, attribute and action instantiations from said specific information system and pass them to the at least one domain module and for driving the information system to execute a demand for action contained in a user query. This has the advantage of providing a modular interface between said at least one domain module and at least one information system.

Preferably, the at least one domain module comprises an element containing information about general notions of objects and attributes common to several application domains. This has the advantage of making said at least one domain module more easily adaptable to various application domains.

One also prefers that the at least one domain module is connectable to a system analyst and linguist for defining the object classes, attribute classes, action classes and phrase set-ups to be contained within said at least one domain module.

More preferably, the aforementioned recognition system is a speech recognition system and the user queries can be voiced by said user.

Alternatively, said recognition system is a handwriting recognition system.

Alternatively, said recognition system is an image recognition system.

The invention also provides A method of enabling a user of at least one information system belonging to an application domain to interact with said at least one information system, so that the at least one information system executes a set of actions on a set of objects characterized by a set of attributes; wherein said actions, objects and attributes are classifiable in action types, object types and attribute categories specific to each one of said at least one information system, and wherein said method comprises the steps of:

identifying the application domain;

defining object, attribute and action classes common to several information systems of said application domain;

constructing phrase setups based on said object, attribute and action classes;

defining the relationships between the object types, attribute categories and action types and object, attribute and action instantiations in each one of the at least one information system and the object, attribute and action classes;

defining a grammar essentially consisting in a set of term elements comprising object, attribute and action instantiations obtained from said at least one information system and a set of rules governing the use of these term elements in a set of valid user query phrases for interaction between a user and said specific information system, by applying in the phrase set-ups object types, attribute categories and action types of said at least one information system and their respective instantiations obtained from said at least one information system, according to the relationships between the object, attribute and action types and instantiations of said specific information system and the object, attribute and action classes contained in said phrase set-ups; and converting a digital form of a user query processed by at least one recognition system into a valid phrase according to said grammar and/or a set of term elements and rules from said grammar; and converting said valid phrase and/or set of term elements and rules into an action description with its related parameters for said specific information system.

Preferably, this method also comprises the step of transmitting said grammar and/or a set of valid phrases according to said grammar to said at least one recognition system for facilitating the recognition of user queries. This has the advantage of potentially increasing recognition speed and accuracy.

Preferably, this method also comprises the steps of:
converting an output of said information system into an output phrase according to said grammar and/or an output set of term elements and rules according to said grammar; and
transmitting a digital form, suitable for being processed by a computer, of said output phrase and/or output set of term elements and rules to at least one output module.

This has the advantage of providing a natural language output more easily understandable by the user.

DETAILED DESCRIPTION OF THE PREFERRED EMBODIMENT

The invention will now be described in detail and non-limitingly by reference to FIGS. 1 and 2 that represent interaction systems according to the invention integrated in their working environments.

Figure 1:
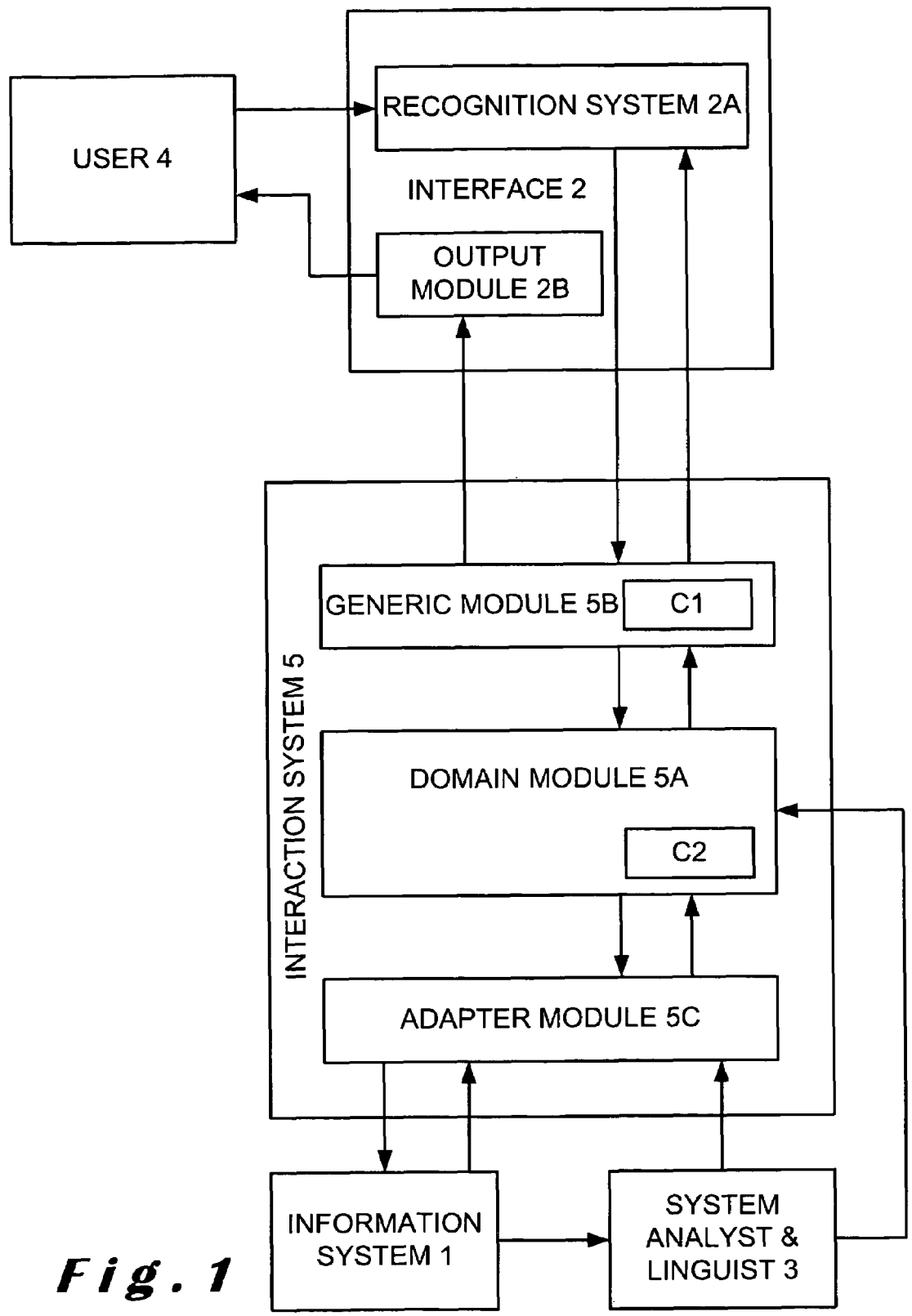
FIG. 1 shows the working environment for the interaction system according to the invention.

Referring to FIG. 1, the working environment comprising the interaction system according to the invention comprises the following elements:

An information system 1 aimed at manipulating specific object instantiations of various object types, each specific object instantiations being characterized by attributes of various attribute categories, the manipulation being performed by means of specific actions of various action types. The specific object and attribute instantiations can be found in the databases manipulated by the information system.

A user interface 2 comprising a recognition system 2a for converting user queries into a digital form suitable to be processed by a computer, and an output generation module 2b for converting a digital output into an output understandable by the user.

A system analyst and linguist 3 which provides the object, attribute and action classes as well as the phrase set-ups that will be used to execute the information system actions. System analysts and linguists analyze how the user would interrogate the system, so as to produce a collection of action phrase set-ups typical of an application domain. The system analyst and linguist 3 can be a human specialist.

An interaction system 5, comprising three types of modules: a domain module 5a for each application domain, a generic module 5b for each recognition system 2a, and an adapter module 5c for each information system 1.

The domain module 5a can receive from the information system 1, through the adapter module 5c, elements such as object types, attribute categories and action types as well as specific object, attribute and action instantiations. The domain module 5a contains the definitions of object, action and attribute classes received from the system analyst and linguist 3, which are typical of a given application domain and uses them to combine the object types, attribute categories and action types and specific object, attribute and action instantiations received from the information system 1 with the aforementioned action phrase set-ups, which it receives from the system analyst and linguist 3, to produce a grammar for the generic module 5b. The action phrase set-ups enable the use of natural language user queries. If multiple information systems 1 are available simultaneously, multiple grammars can be generated and activated, and the interaction system 5 will be able to switch between the multiple information systems 1. The domain module 5a can also take a valid phrase for interaction with the information system 1, that is, a phrase in accordance with said grammar, and generate an action description to be executed by the information system 1 on specific objects identified by specific attribute values.

The aforementioned definitions are contained within a storage element c2 of the domain module, that contains:
Information common to several domains, such as general notions of objects and attributes identifying objects;
the domain identification comprising configuration elements identifying an application domain, such as for example GIS information systems;
the object classes belonging to this application domain;
the actions classes that can be applied to the object classes;
the attribute classes that can be attached to the objects;
the various phrase set-ups that can be used to request the execution of the actions; and
the term elements that assembled in sequences compose valid phrases.

Each object class represents a set of objects with a common characteristic. For example, in GIS applications, there are object classes such as area object class (countries, counties), linear object class (rivers, streets), punctual object class (cities), graphical object class (aerial photography geographically referenced, maps), displayable object class (rivers, streets, cities) or selectable object class (countries, counties, cities, streets). An individual object may be part of several object classes. For example, in the GIS domain, an object such as a street will belong to the displayable object class, selectable object class, and linear object class.

Associated with each object class, one can define, for a given application domain, a class of action that can be applied to that object class. For example, in the GIS application domain, an object belonging to the displayable object class can be displayed or hidden, an object belonging to the spatial object class can be projected on a map or be intersected with another object belonging to the same class, an object belonging to the selectable object class can be selected or deselected, an object belonging to the linear object class can be moved along for a certain distance to provide a specific location. Whatever may be the specific object types and instances, it is always possible to manipulate (show, select, highlight, . . . ) punctual, linear and area objects contained by another area object, manipulate area objects crossed by linear objects or manipulate punctual objects along a given linear object.

An attribute class groups attributes with a common meaning toward the objects of all the object classes. Namely, attributes belonging to the 'instantiation naming' class are used to identify a specific object of an object type. For example, if in the GIS application domain, roads have an attribute which is "road number" whose values are numbers. "Road number" is therefore of the 'numerical' attribute type but also part of the attribute class 'instantiation naming' because roads can be referred to in speech by their number.

Associated with each action class, there can be defined a set of phrase set-ups that can be used to request the class action to be done. For example, in the GIS application domain, phrase set-ups such as display 'xyz' or go to 'abc' can be defined. As 'xyz' or 'abc', the attribute class used to identify the object types on which the action will be performed can be referenced. These set-ups will be tailored to a specific information system by applying object types, action types, and attribute categories and specific object, action and attribute instantiations belonging to those manipulated by the specific information system with which the user will interact. Furthermore, the actions like 'display' or 'go to' can have synonyms that could easily be exchanged with the original terms. This means that multiple variants of a same phrase set-up can exist without substantial changes in its grammatical structure.

Among the term elements, there are static term elements whose instances do not need to be extracted from the information system 1 such as numbers or comparison operators, and dynamic elements such as specific objects, attributes and action instantiations that need to be extracted from the information system 1. Statically defined term elements are a straightforward list of terms, which elements can be predetermined during the domain module configuration.

Each of these elements can be flagged as optional; this means these are elements that can be excluded from a phrase without impairing its meaning, such as politeness expressions.

Each of these elements can also be flagged as repetitive, as for composing numerical values, spelling identification codes or specifying geographical positions.

For example, in the GIS domain, one may have the following sequence of static term elements: [−1] [ 2] [+3] [−4] where [−1] mark an optional term list composed of the terms 'please' and 'can you', [ 2] marks an obligatory term list composed of 'pan to the' or 'move to the', [+3] marks a repetitive term list composed of the terms 'north', 'east', 'west', south', [−4] mark an optional term list composed of the terms 'please'. Consequently, the following are valid phrases based on these elements: "pan to the north east", "can you move to the south south east please".

Phrases such as [1] [2] [3] and [1] [4] [3] [5] [2] can also be built, in which [1] is either 'show' or 'display', [2] is a related object instantiation name, [3] is a spatial object type name, [4] is 'the', [5] is 'of. [2] and [3] are dynamic term elements. Then, if the dynamic elements extracted from the information system are two spatial objects called city and country and two instance names called New-York and Paris for the city and New-York and France for the country, then the combination generation will generate the following phrases:

[1] [2a] [3a]
[1] [2b] [3b]
[1] [4] [3a] [5] [2a]
[1] [4] [3b] [5] [3b]
in which
[2a] will be either New-York or Paris
[3a] will be city
[2b] will be either New-York or France
[3b] will be France
resulting in particular phrases like "show New-York city" or "display the country of France".

Hereunder follows a more detailed example of classification of information treated by an interaction system 5 as represented in FIG. 1 for enabling a user to interact with a information system 1 of the GIS application domain. The information system 1 is capable of displaying or selecting spatial objects either by property values or by spatial relationships.

Associated with this system, we have object types being countries and cities; the specific objects of these object types have two associated attributes being name and population. Name is of the textual attribute type, population of the numerical attribute type.

For the countries, we have two specific objects: the U.S.A. and France. Their respective populations are 250000000 and 60000000 inhabitants.

For the cities we have six specific objects: New York, Los Angeles, Dallas, Paris, Lyon, Marseille. Their respective populations are 1200000, 10000000, 500000, 6000000, 1000000, 800000 inhabitants.

In the English language, one can define the following phrases to access the objects through the interaction system 5:
  Generic display/hiding operations:
    Display the countries
    Hide the countries
    Display the cities
    Hide the cities
  Global selection operations:
    Select all the countries
    Select all the cities
  Naming attribute selection operations:
    Select the country named France
    Select the city named Los Angeles
  Attribute condition expressions:
    Having U.S.A. as name
    With a population exceeding 1000000
  Attribute related selections:
    Select the country which name is U.S.A
    Select the city with a population of 12000000 inhabitants.
  Spatial condition expressions:
    Within the U.S.A.
  Spatial related selections:
    Select the cities within the U.S.A
    Select the country wherein lies Paris Thus we will define the following configuration items for the c2 element of the domain module 5a of the interaction system 5:
  Domain definition:
    Domain X
  Object classes:
    Displayable objects
    Selectable objects
    Spatially enclosing objects
    Spatially enclosed objects
    Numerically discriminated objects
    Instance named objects.
  Action classes (examples):
    For displayable objects:
      Display (presentation of the objects to the user)
      Hide (masking of the objects from the user)
    For selectable objects:
      Select All (selection of the objects)
      Deselect (de-selection of the objects)
  Attribute classes:
    Object instance naming attribute
    Queryable attribute
  Attribute types:
    Numeric value attribute
    Textual value attribute
  Action phrase set-ups:
    List all ('List all countries', 'List all cities')

Select all ('Select all countries')
Condition ('With a population exceeding 5 million')
Sequences of term elements (example)
Condition command=[1] [2] [3] [4] [5]
Dynamic Term elements
[3]: queryable numeric attributes such as "population".
Static Term elements
[1]=With/having
[2]=a
[4]=less than/greater than/equal to
[5]=number values The generic module 5b can receive from the domain module 5a said sets of term elements and rules and/or a set of valid phrases generated by using said sets of term elements and rules and convert them into a digital form suitable for being processed by the recognition system 2a for the recognition of user queries and for receiving a digital form of a user query, produced by said recognition system 2a in response to said user query and suitable for being processed by a computer, and converting it into a valid phrase according to said grammar and/or into term elements and rules from said sets of term elements and rules.

Said generic module 5b comprises a storage element c1 containing recognition system configuration information, namely the recognition software used, the language used, and the communication devices used such as for example microphones, or telephone devices.

The adapter module 5c can extract the object, attribute and action types and instantiations from the information system 1 and pass them to the domain module 5a where they are referenced in objects, attributes and action classes defining the application domain. On the other hand, said adapter module 5c is able to drive the information system 1 in order for it to execute the demand for action contained in a user query. This requires the adapter module 5c to translate the action description provided by the domain module 5a into the application logic of the information system 1.

The transmission of information between the different elements of the working environment defined here above occurs as follows:

From the generic module 5b to the recognition system 2a: a set of valid user query phrases and/or grammar essentially consisting in a set of term elements and a set of rules governing the combination of these term elements into valid user query phrases, in a digital form suitable for being processed by the recognition system 2a.

From the user 4 to the recognition system 2a: a natural language user query.

From the recognition system 2a to the generic module 5b: a recognized user query in the digital format of the recognition system 2a.

From the generic module 5b to the output module 2b: a digital output in the format of the output module 2b.

From the output module 2b to the user 4: a natural language output in a format understandable to the user 4.

From the domain module 5a to the generic module 5b: a set of valid user query phrases and/or an output phrase and/or a set of term elements and a set of rules governing the use of these term elements in valid user query phrases and/or in an output phrase.

From the generic module 5b to the domain module 5a: the recognized user query decomposed into an identification of a valid user query phrase or of a set of rules and term elements contained in the user query.

From the adapter module 5c to the domain module 5a: a list of object types, attribute categories and action types with their corresponding object, attribute and action classes, as well as specific object, attribute and action instantiations to be used in a set of valid user query phrases and/or an output phrase.

From the domain module 5a to the adapter module 5c: an action description with related parameters to be executed by the information system 1. These parameters may include specific object and attribute instantiations. In ambiguous cases where two different instantiations of actions or objects could be accessed by the same user command, the different possibilities can be returned to the information system 1 by the domain module 5a, for the adapter module 5c to remove the ambiguity using information contextual to the information system 1 or by asking feedback from the user 4.

From the information system 1 to the adapter module 5c: idem as from the adapter module 5c to the domain module 5a but in the logic language of the information system 1, thus depending on the specific information system 1.

From the adapter module 5c to the information system 1: idem as from the domain module 5a to the adapter module 5c but in the logic language of the information system 1, thus depending on the specific information system 1.

The use of the embodiment of the interaction system 5 represented in FIG. 1 implies the following steps:

The application domain of the information system 1 is identified.

The system analyst and linguist 3 defines the object, attribute and action classes and related action phrase set-ups required by said domain.

This information is encoded into an internal format suitable for being processed by the domain module 5a.

The system analyst and linguist 3 defines the relationships between object, attribute and action classes contained in the domain module 5a and the object, attribute and action types and specific object, attribute, and action instantiations of the information system 1.

This information is encoded into an internal format suitable for being processed by the adapter module 5c.

The information system 1 is started.

The information system 1 starts the adapter module 5c.

The adapter module 5c receives the available specific object, attribute and action instantiations and passes this information to the domain module 5a.

The domain module 5a uses the object, attribute and action classes and action phrase set-ups aforementioned to build sets of term elements and rules, eventually converts at least some of them into a set of valid user query phrases, and transmits said term lists and rules and/or said set of valid user query phrases to the generic module 5b.

The generic module 5b converts the sets of term elements and rules and/or set of valid user query phrases received from said at least one domain module 5a into a digital form suitable for being processed by the recognition system 2a for the recognition of user queries and starts the latter.

The user 4 makes a query.

The recognition system 2a, after a plausible user query is recognized, returns the recognized plausible user query phrase and/or a rule identification and a set of term elements corresponding to said plausible user query phrase to the generic module 5b, in the digital format of the recognition system 2a.

The generic module 5b converts the recognized plausible user query phrase and/or rule identification and set of term elements corresponding to said plausible user query phrase into a format suitable for being processed by the domain module 5a and passes it back to the domain module 5a. If it receives a recognized plausible user query phrase from the recognition system 2a, it can eventually parse back the phrase into a rule identification and a set of term elements.

The domain module 5a issues an action description with related parameters to the adapter module 5c.

The adapter module 5c translates this action description to the information system 1.

If the information system 1 produces an output comprising object types, action types and attribute categories and/or specific object, attribute and action instantiations in response to the user query, these additional steps will follow:

The adapter module 5c translates this output to the domain module 5a.

The domain module 5a uses this translated output and the object, attribute and action classes and action phrase set-ups aforementioned to build a set of term elements and a set of rules governing the combination of said term elements to form an output phrase, and transmits these sets of term elements and rules and/or an output phrase according to them to the generic module 5b.

The generic module 5b translates these sets of term elements and rules and/or output phrase according to them into a digital form suitable for being processed by the output module 2b.

The output module 2b issues an output understandable to the user 4.

Figure 2:
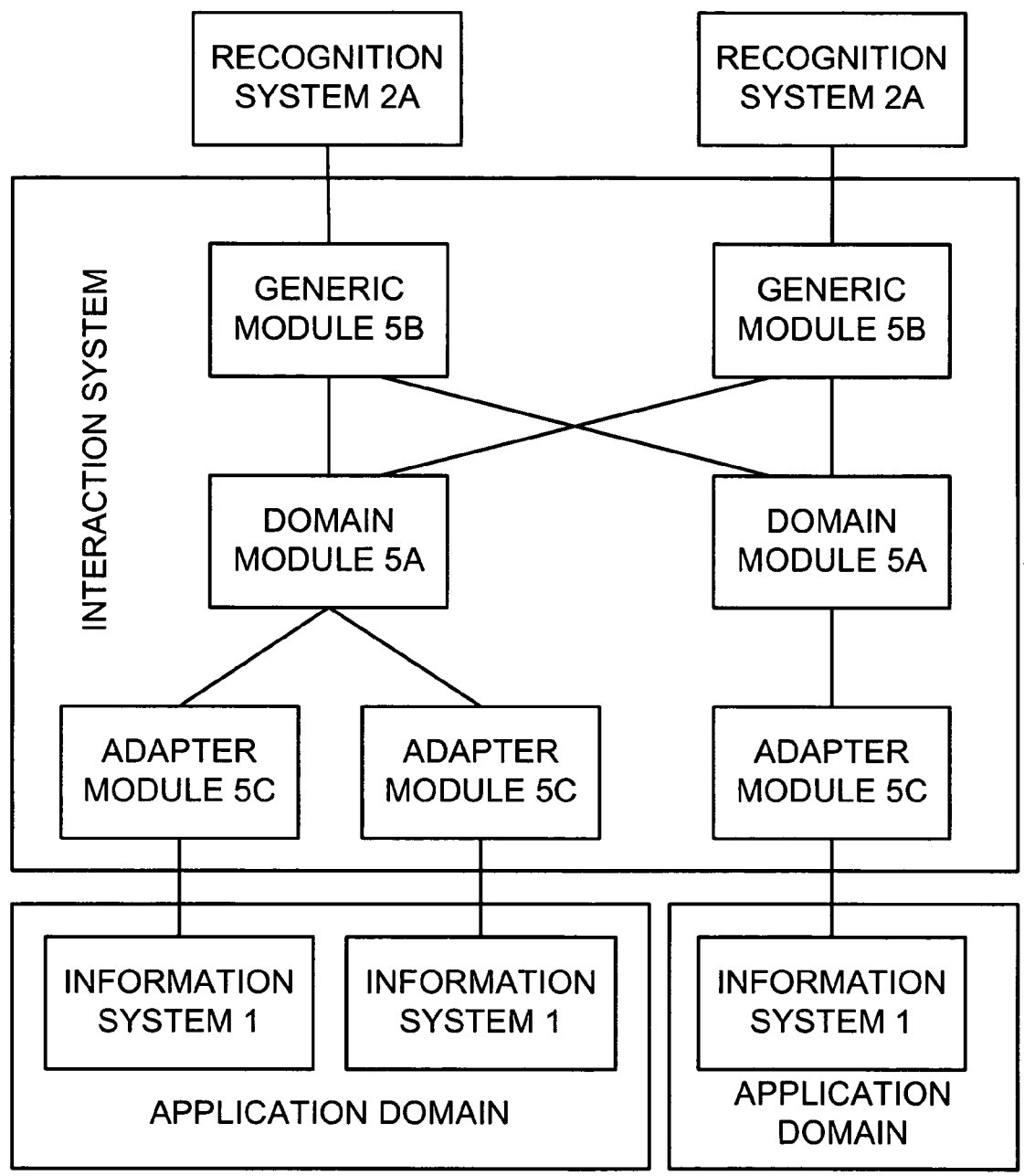
FIG. 2 illustrates how the modular nature of the interaction system provides versatility of operations.

Referring now to FIG. 2, it illustrates how the modular nature of the interaction system 5 provides versatility of operations. One interaction system 5 can comprise a plurality of generic modules 5b for connecting with a plurality of different recognition systems 2a. It can also comprise a plurality of domain modules 5a for interacting with information systems 1 in a plurality of different application domains. Finally, each domain module 5a can in turn be connected to a plurality of adapter modules 5c for interacting with a plurality of different information systems 1 within the same application domain.

Each module of the interaction system of the invention can be realized as a software module, using any convention programming language, to be executed by a conventional programmable processor with the appropriate input and output connections, or as a hardwired hardware module, with the appropriate input and output connections.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

The invention claimed is:

1. An interaction system for enabling interaction with at least one of several information systems belonging to a single application domain, the at least one information system configured to execute a set of actions on a set of objects characterized by a set of attributes; wherein the interaction system comprises:

at least one adapter module configured to access said actions, objects and attributes classifiable in action types, object types and attribute categories specific to each one of said at least one information system, and in action classes, object classes and attribute classes common to said several information systems of said application domain;

at least one domain module for containing the object classes, attribute classes and action classes common to said several information systems of a single application domain, and phrase setups;

each phrase setup having a structure comprising a selection of said object classes, attribute classes and action classes and being provided to be tailored to said at least one information system by applying in the phrase setup:

a) the specific object types, action types and attribute categories of said at least one information system corresponding to, respectively, the object, action and attribute classes in said phrase setup, and b) object, action and attribute instantiations obtained from said at least one information system corresponding to, respectively, the object, action and attribute classes in said phrase setup, in order to define a grammar essentially consisting of a set of term elements comprising the object, attribute and action instantiations obtained from said at least one information system and a set of rules governing the use of these term elements in a set of valid user query phrases for interaction between the user and said at least one information system through said recognition and interaction systems;

at least one generic module, connected to the at least one domain module and connectable to said at least one recognition system, for converting said sets of term elements and rules and/or a set of valid user query phrases generated using said sets of term elements and rules into a digital form suitable for being processed by the recognition system for the recognition of user queries and for converting a digital form of a used query, produced by said recognition system in response to said user query and suitable for being processed by a computer, into a phrase according to said grammar and/or into term elements and rules from said sets of term elements and rules;

wherein the interaction system is connectable to said at least one information system and to a user interface comprising at least one recognition system, so as to enable the user to interact with the at least one information system by means of user queries processed by said at least one recognition system.

2. The interaction system according to claim 1, wherein said generic module comprises an element containing recognition system configuration information.

3. The interaction system according to claim 1, also comprising:
   the at least one adapter module connected to the at least one domain module for receiving object types, attribute categories and action types of said specific information system as well as object, attribute and action instantiations from said at least one information system and pass them to the at least one domain module and for driving said at least one information system to execute a demand for action contained in a user query.

4. The interaction system according to claim 1, wherein the at least one domain module comprises an element containing information about general notions of objects and attributes common to several application domains.

5. The interaction system according to claim 1, wherein the at least one domain module is connectable to a system analyst and linguist for defining the object classes, attribute classes, action classes and phrase set-ups to be contained within said at least one domain module.

6. The interaction system according to claim 1, wherein said at least one recognition system comprises a speech recognition system and the user queries can be voiced by said user.

7. The interaction system according to claim 1, wherein said at least one recognition system comprises an image recognition system.

8. The according to claim 1, wherein said recognition system comprises a handwriting recognition system.

9. The interaction system according to claim 1, wherein said interaction system is also connectable to at least one output generation module for transmitting to said at least one output generation module a digital form, suitable for being processed by said at least one output generation module, of an output of said at least one information system in the form of an output phrase also according to said grammar or of its component term elements and at least one rule from said grammar governing the use of said term elements in an output phrase.

10. A method of enabling interaction via an interaction system with at least one of several information systems belonging to a single application domain so that the at least one information system executes a set of actions on a set of objects characterized by a set of attributes; wherein said actions, objects and attributes are classifiable in, respectively, action types, object types and attribute categories, wherein said method comprises the steps of:
receiving at a domain module of the interaction system defined object, attribute and action classes common to said several information systems of a single application domain;
receiving at the domain module constructed phrase setups, each phrase setup having a structure comprising a selection of said object, attribute and action classes;
receiving at the domain module defined relationships between the specific object types, attribute categories and action types and object, attribute and action instantiations in each one of the at least one information system and, respectively, the common object, attribute and action classes;
defining at the domain module a grammar including a set of term elements comprising object, attribute and action instantiations obtained from said at least one information system and a set of rules governing the use of these term elements in a set of valid user query phrases for interaction between a user and said specific information system, by applying in the phrase set-ups object types, attribute categories and action types of said at least one information system and their respective instantiations obtained from said at least one information system, according to the relationships between the object, attribute and action types and instantiations of said specific information system and the object, attribute and action classes contained in the structures of said phrase set-ups; and
converting via a generic module of the interaction system a digital form of a user query processed by at least one recognition system into a valid phrase according to said grammar and/or a set of term elements and rules from said grammar from the domain module; and converting said valid phrase and/or set of term elements and rules into an action description with its related parameters for said specific information system.

11. The method according to claim 10, also comprising the step of transmitting said grammar and/or a set of valid phrases according to said grammar to the at least one recognition system for facilitating the recognition of user queries.

12. The method according to claim 10, wherein the at least one recognition system is a speech, image or handwriting recognition system.

13. A method of enabling interaction via an interaction system with at least one of several information systems belonging to a single application domain so that the at least one information system executes a set of actions on a set of objects characterized by a set of attributes; wherein said actions, objects and attributes are classifiable in, respectively, action types, object types and attribute categories, said method comprises the steps of:
receiving at a domain module of the interaction system defined object, attribute and action classes common to said several information systems of said application domain;
receiving at the domain module constructed phrase setups, each phrase setup having a structure comprising a selection of said object, attribute and action classes;
receiving at the domain module defined relationships between the specific object types, attribute categories and action types and object, attribute and action instantiations in each one of the at least one information system and, respectively, the previously defined common object, attribute and action classes;
defining at the domain module a grammar including a set of term elements comprising object, attribute and action instantiations obtained from said at least one information system and a set of rules governing the use of these term elements in a set of valid user query phrases for interaction between a user and said specific information system, by applying in the phrase set-ups object types, attribute categories and action types of said at least one information system and their respective instantiations obtained from said at least one information system, according to the relationships between the object, attribute and action types and instantiations of said specific information system and the object, attribute and action classes contained in the structures of said phrase set-ups;
converting via a generic module of the interaction system a digital form of a user query processed by at least one recognition system into a valid phrase according to said grammar and/or a set of term elements and rules from said grammar from the domain module;
converting said valid phrase and/or set of term elements and rules into an action description with its related parameters for said specific information system;
converting an output of said information system into an output phrase according to said grammar and/or an output set of term elements and rules according to said grammar; and
transmitting a digital form, suitable for being processed by at least one output module, of said output phrase and/or output set of term elements and rules to said at least one output module.

14. The method according to claim 13, also comprising the step of transmitting said grammar and/or a set of valid phrases according to said grammar to said at least one recognition system for facilitating the recognition of user queries.

15. The method according to claim 13, wherein said at least one recognition system is a speech, image or handwriting recognition system.

* * * * *